United States Patent [19]

Shoemaker

[11] 4,065,166
[45] Dec. 27, 1977

[54] DEMOUNTABLE EXTENSION ENCLOSURE FOR MOTOR VEHICLES

[76] Inventor: Brian C. Shoemaker, 2707 W. 144th St., Gardena, Calif. 90249

[21] Appl. No.: 718,143

[22] Filed: Aug. 26, 1976

[51] Int. Cl.² .............................................. A45F 1/06
[52] U.S. Cl. ................................ 296/23 G; 135/5 A; 296/26
[58] Field of Search ............... 296/23 G, 23 R, 23 A, 296/23 F, 26, 23 MC; 135/1 A, 3 A, 4 A, 5 A

[56] References Cited

U.S. PATENT DOCUMENTS

| 3,888,539 | 6/1975 | Niessner | 296/23 D |
| 3,968,809 | 7/1976 | Beavers | 135/4 A |

*Primary Examiner*—Philip Goodman
*Attorney, Agent, or Firm*—Donald Diamond

[57] ABSTRACT

A temporary extension enclosure for motor vehicles having enclosed bodies, includes a tent-like sheath erected atop a floorboard which extends horizontally from the doorway of the loading door of such vehicles. The floorboard is arranged to act as an extension of the floor of the vehicle body and is supported on and releasably secured in position by brackets at the lower frame of the loading door and by hangers affixed to the laterally opening door panels which normally close the doorway itself. The tent-like sheath may be attached to the vehicle body by snap closures and may be provided with a door, formed by tent-flaps, and with windows.

10 Claims, 7 Drawing Figures

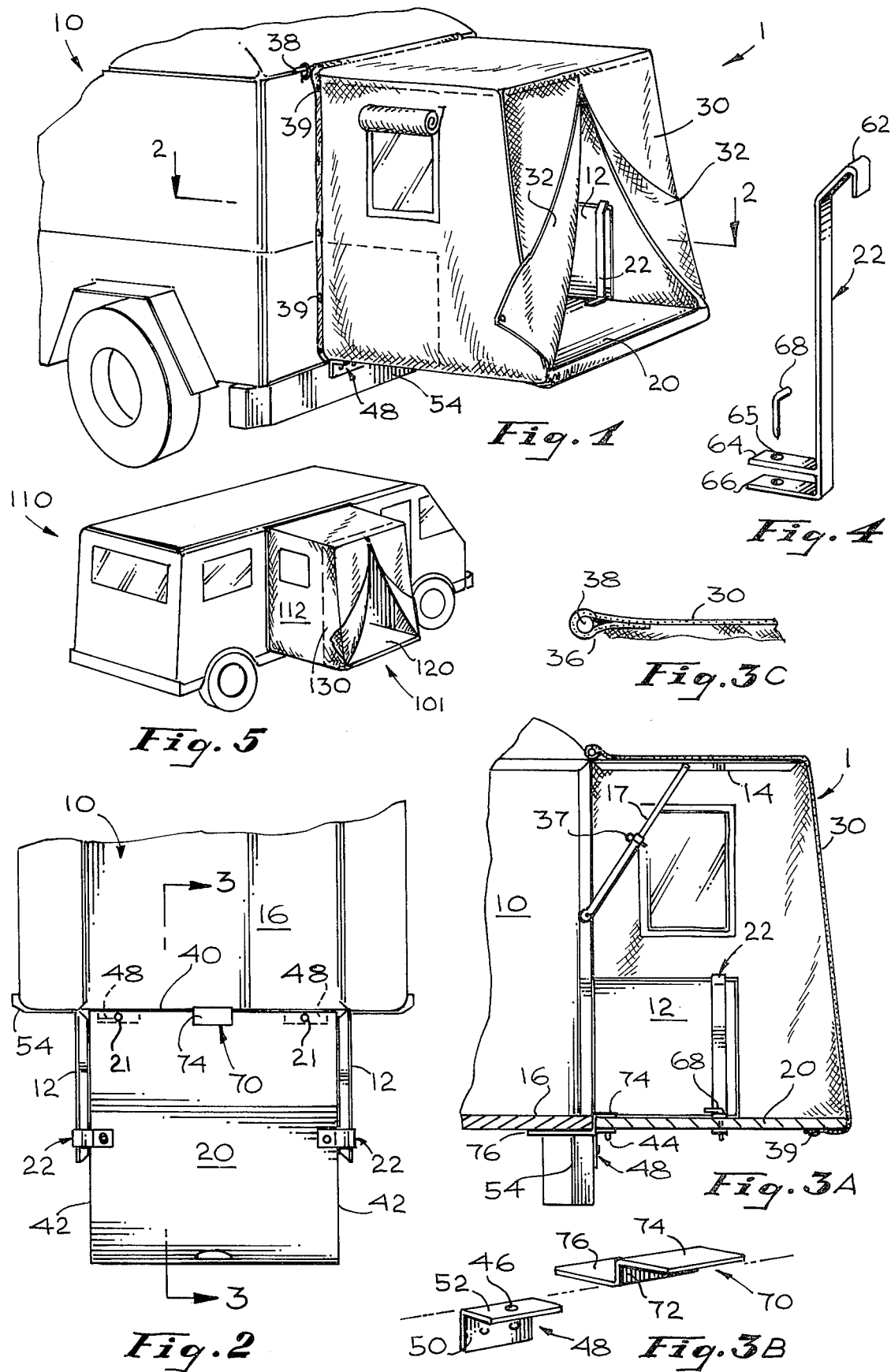

DEMOUNTABLE EXTENSION ENCLOSURE FOR MOTOR VEHICLES

BACKGROUND OF THE INVENTION

The invention relates to camper conversions for motor vehicles. It relates, more particularly, to such conversions which extend the floor of the vehicle body to provide additional shelter space.

The recent expansion of motor camping has resulted in a wide variety of special designs to satisfy the requirement for shelter space at night. Camper bodies for pick-up trucks, tents specially adapted to be carried on roofracks, temporary conversions for 'hatchback' car bodies, and many others have been proposed in the prior art.

None of the available devices of the art addresses itself to the task of providing sleeping space to the occupants of motor vehicles such as enclosed cross-country vehicles, vans and the like which inherently have a flat floor inside an enclosed body, but where the dimensions of that floor are marginal for use as a sleeping surface.

It is, therefore, the primary object of this invention to provide extension housing means for motor vehicles with enclosed bodies, in which the extension housing is provided with a floorboard coplanar with the floor of the vehicle proper.

It is an additional object of this invention to provide an extension housing means, for motor vehicles, which may be packed into a small volume and readily carried within such vehicles.

It is a further object of this invention to teach constructional details which provide for economic manufacture and ease of erection and use of such extension housings for motor vehicles.

SUMMARY OF THE INVENTION

The invention herein utilizes the presence in motor vehicles such as enclosed cross-country vehicles, vans and the like, of a loading door of substantial width which is adapted for loading cargo into and unloading of cargo from the internal volume of such vehicles. The substantial width of the doorway and the desire for close access to the floor of the vehicle require the use of door leaves which are generally symmetrical and hinged along the vertical sides of the door frame. In some vehicles such doors extend to the roofline, while in others they extend partway up from the floor level with the balance of the doorway closed by a lift-up panel.

The outward, horizontal extension of the vehicle floor is accomplished by the provision of a flat floorboard whose width corresponds to the width of the door opening. This floorboard is made rigid and of sufficient load carrying capacity to accept the placement thereon of people, provisions, bedding and the like during use.

Locating and securing means are provided for maintaining and affixing the floorboard along the lower frame of the doorway, proximate to the vehicle floor. In one embodiment the locating and securing means comprise brackets attached to the frame and releasable locking means for releasably securing the floorboard to the brackets. In another embodiment, the locating and securing means may comprise a channel running along the outboard edge of the base of the door frame with an upwardly open profile, and a key depending from the lower surface of the floorboard in such a manner that, once the key is mated with the channel and the floorboard brought into the horizontal, the floorboard becomes a substantially coplanar extension of the vehicle floor.

Support means such as hangers are provided to support the outboard portion of the floorboard of the extension housing. The hangers are engaged on the laterally opening doorleaves of the doorway, either being affixed to them permanently or temporarily secured in a manner ensuring a load bearing capacity commensurate with the service loading. Each hanger is provided with a pair of tines facing inward — towards the opposite doorleaf. These tines are spaced by an amount corresponding to the local thickness of the floorboard and are designed to engulf the sideboard edges of the floorboard near the outboard edge thereof. Mechanical latching means may be provided, in the form of releasable locking pins, for example, to secure the floorboard to the hangers during use.

The floorboard provides the base for the extension housing, and the open doorleaves define the location of the sidewalls. The roof, the sides and the outboard face of the extension housing are defined by a flexible fabric housing in the form of a tent-like structure. This structure is secured to the vehicle around the side and upper door frame portions and disposed about the sideboard and outboard edges of the floorboard. Thus, the tent device encloses the volume defined by the floorboard in plan and the height of the vehicle compartment in elevation, with the fabric housing being open with respect to the doorway of the vehicle. The fabric structure may be provided with windows, doors, tent flaps and other accessories as required for the habitability of the enclosed living space defined by the interior of the vehicle body and the extension enclosure described hereinabove.

DESCRIPTION OF THE DRAWINGS

FIG. 1 is a perspective view of the rear of an enclosed, cross-country type vehicle, upon which a demountable extension housing of the invention has been erected, to provide sleeping accommodation;

FIG. 2 is a partial section, in plan, taken along section line 2—2 in FIG. 1;

FIG. 3A is a transverse section through the extension housing of FIG. 1, taken along section line 3—3 in FIG. 2;

FIG. 3B is a perspective view of the central bracket adapted to be removably mounted to the vehicle, and a lateral bracket;

FIG. 3C is a fragmentary view, in elevation, of the manner of securing the tent structure of the embodiment of FIG. 1 along the rain gutter of the parent vehicle;

FIG. 4 is a perspective view of one of the hangers for suspending the floorboard of the extension housing from the laterally opening doors of the parent vehicle; and FIG. 5 is a perspective view of an alternate embodiment of the extension housing of the invention adapted for use with, and mounted upon, a van-type vehicle with laterally opening doors at the side of the vehicle body enclosure.

DESCRIPTION OF THE PREFERRED EMBODIMENT

Referring now to the drawings, FIG. 1 illustrates the use of an extension housing 1 in conjunction with a typical enclosed, cross-country type vehicle 10. The vehicle 10, as shown in the perspective view of FIG. 1, is provided with a rear loading door normally closed off by three door panels.

Two door panels 12 are mounted on vertically aligned hinges in the lower portion of the doorway, while a lift gate 14, hinged along the upper edge of the doorway, and supported by a telescoping strut 17 at each side, is mounted to close the upper portion of the doorway, as shown in FIG. 3A. All three doors are utilized to support the extension housing 1.

The principal load-bearing structure of the housing 1 is provided by a floorboard 20 whose width is equal to the lateral clear space defined by the opened doors 12 and whose length is slightly longer than the projecting dimension of the lift gate 14. The floorboard may be fabricated from wood, plastic or metal. A particularly suitable material is plywood, of appropriate thickness, which may be covered with carpeting or matting.

Two laterally spaced, transverse apertures 21 are provided in the floorboard 20. These apertures, which are disposed near the inboard 40 and sideboard 42 edges of the floorboard, are engaged by releasable locking pins 44 which also pass through apertures 46 in cooperating, vehicularly mounted, lateral brackets 48 to secure the floorboard proximate to the lower edge of the doorway. The lateral brackets comprise vertical portions 50 and outwardly extending, horizontal portions 52. The vertical portions are bolted, or otherwise secured, to the vehicle rear frame 54 and the horizontal portions of the brackets are provided with the apertures 46 for receiving the releasable locking pins. A central bracket 70 is removably mounted to the vehicle between the lateral brackets. The central bracket comprises a vertical plate 72 having an outwardly extending, horizontal flange 74 at its upper end for overlying the top of the floorboard adjacent to the inboard edge thereof. The lower end of the vertical plate is provided with an inwardly directed, horizontal mantel 76 for insertion into the slot between the vehicle frame and body. The two lateral brackets 48, the central bracket 70 and the floorboard 20 with its apertures 21 are so arranged that, upon engagement of the releasable locking pins 44 with the mating apertures, the floorboard is aligned with, and forms a substantially smooth, horizontal extension of, the floor 16 of the enclosed rear body of the vehicle 10.

Most of these constructional elements are not visible in FIG. 1, where the structure of the extension housing is covered with a tent-like fabric sheath 30. The sheath 30 is formed of two side panels, a rear panel and a roof panel; with the side and rear panels depending from the roof panel and secured to the vehicle body and to the underside of the floorboard 20 by means of snap fasteners 39. In another embodiment, for securing the tent to the underside of the floorboard, the lower end of the tent is provided with a sleeve containing elastic cord having hook terminating ends which tautly engage the vehicle. The rear panel of the sheath 30 is divided into tent flaps 32 by a zip fastener, shown in the open condition in FIG. 1, revealing one of the doors 12 and a hanger 22 secured thereto for the support of the floorboard 20.

FIG. 2 is a planar section through the embodiment of FIG. 1, showing the spatial arrangement of the hangers 22, central bracket 70, and floorboard apertures 21 engaged by releasable locking pins 44. The central bracket, which is held in a frame channel, is removable from its mounting in order to permit closure of the bottom doors.

FIG. 3A is a longitudinal section through the extension housing, taken along section line 3—3 in FIG. 2. The open position of a door 12 and of the lift gate 14 is clearly visible, as is one of the struts 17 which support the lift gate in the open position. Since the spatial definition of the extension housing 1 is partly determined by the door 14 acting as support for the roof panel of the sheath 30, a releasable locking pin 37 is installed in one or both of the struts 17 to prevent an unintended collapse of the struts when they are in the extended position. Similar measures are not required with respect to the laterally opening doors 12 since the floorboard 20 acts as a wedge to keep them secure in the desired position.

FIG. 3B is a perspective view of the removable central bracket 70, hereinabove described, which provides additional vertical locking support for the floorboard, and a lateral bracket.

FIG. 4 is a perspective view of a typical hanger 22 for supporting the outer end portion of the floorboard. In the embodiment of FIGS. 1 through 4, the hanger is an elongated metal strap formed into a hook 62 in its upper end and provided at its bottom end with parallel tines 64 and 66 having aligned apertures 65 therein. The hook 62 is slipped over the upper edge of a door 12 and the tines are manipulated to receive the thickness of the floorboard 20 between them and to align hanger support apertures in the floorboard with the apertures in the tines. The interlock between the hanger and the floorboard is attained by the use of a releasable locking pin 68, passing in succession through the apertures in the tine 64, the floorboard 20, and the lower tine 66.

FIG. 3C illustrates an optional method of securing the roof panel of the tent sheath 30 to the roof of the vehicle 10. The free edge of the sheath 30 is shown doubled back on itself to form a sleeve 36 encompassing a dowel 38. The dowel 38 is longer than the width of the sheath and the projecting ends are secured to the raingutter of the vehicle roof by hooks or clamps such as C-clamps which may be pivotally attached to the tent body. The roof panel could, of course, be secured to the vehicle roof by snap fasteners 39, as employed for the other panels of the sheath 30, but the structure shown in FIG. 3C has been found to provide excellent sealing against rainwater entry into the living space created by the extension enclosure 1.

As discussed above, the primary feature of the enclosure of the invention is the provision of a platform, or floorboard, substantially coplanar with the floor of the parent vehicle. This is clearly illustrated in FIG. 3A, where the upper surface of the floorboard 20 is substantially coplanar with the floor 16 of the vehicle 10. The details of the bracket system attaching the platform to the lower frame of the doorway, and the manner of securing the hangers on the laterally opening doors of the vehicle, are necessarily dependent on the details of the construction of the vehicle itself and on the use to which it is put when it is not utilized as a camper. Such variations in the mounting details are deemed to be encompassed by the present disclosure and would be apparent to those skilled in the art of constructing campers and their like, once exposed to the teachings herein.

FIG. 5 is a perspective view of a van-type vehicle 110 with a doorway for curbside loading in the side of the van enclosure, covered by laterally opening doors 112.

An extension enclosure 101, constructed in accordance with the invention, is shown mounted upon a platform 120 located between the doors 112 adjoining the van floor. The platform 120 is secured by brackets to the doorway and by hangers, equipped with tines, to the doors 112. Since many van bodies provide a well in the doorway to receive the lower edges of the doors, it is usually possible to secure the hangers, with pivotally mounted tines, permanently to the inner door panels and still retain the ability to close the doors.

The enclosure 101 is defined by the platform 120, by the two door panels 112 and by a fabric sheath 130 having a roof panel and a rear panel, as well as side flaps with snap fasteners being employed for securing the fabric sheath to the vehicle and the platform. Because of the use of the doors as part of the completed enclosure the provision of additional windows is not usually required. To provide lateral rigidity, and support for the seam between the vehicle roof and rear panel of the tent-sheath 130, a spreader bar may be disposed between, and secured to, the upper corners of the door-leaves 112.

When the vehicle is equipped with a soft, fabric top in combination with a loading doorway having two bottom swing out doors, then auxialliary frame means are provided for effecting the tent roof support.

It is foreseen that the principal use of the demountable enclosure of the invention will be to permit the use of vehicles as campers where neither of the principal dimensions of the floor of the vehicle itself is sufficiently large to encompass the length of a reclining person. In such vehicle the use of such an extension enclosure will permit its conversion to a camper for overnight habitation, with a minimum of cost and labor.

As an additional convenience, the platform of the enclosure may be erected by itself, without the fabric cover, and used as a table or working surface, as required.

That which is claimed is:

1. A demountable extension enclosure for a motor vehicle provided with an enclosed rear compartment having at least one doorway opening covered with a plurality of door panels, with two door panels of said plurality of panels comprising a substantially symmetrical and cooperating pair and being laterally openable on hinges arranged along the opposed, vertical side frames of said doorway, said extension enclosure comprising:
   a flat floorboard substantially aligned with, and forming an outward, horizontal extension of, the floor of said vehicle compartment;
   locating and securing means for maintaining and affixing said floorboard along the lower frame of said doorway, proximate to said floor;
   support means disposed on the inner face of each of said laterally openable doors and secured thereto for supporting said floorboard near its outboard edge; and
   a flexible fabric housing attached to said vehicle and disposed about the sideboard and outboard edges of said floorboard, enclosing the volume defined by said floorboard in plan and the height of said vehicle compartment in elevation, said fabric housing being open with respect to the doorway of said vehicle.

2. The demountable enclosure of claim 1 wherein said locating and securing means include a plurality of brackets attached to the vehicle at loci downwardly adjacent to the lower frame of the doorway opening, with said brackets and said floorboard having cooperatively aligned apertures for receiving releasable locking pins for securing the floorboard to the brackets.

3. The demountable enclosure of claim 2 wherein said support means comprise hangers with each hanger being provided with a pair of tines for encompassing and supporting the opposed lateral ends of the floorboard near its outboard edge.

4. The demountable enclosure of claim 3 wherein said hangers are provided with integral hooks at their upper extremities for engaging the upper edges of said laterally openable doors.

5. The demountable enclosure of claim 4 wherein the hanger tines and the floorboard are provided with cooperatively aligned apertures for receiving releasable locking pins for supportably securing said floorboard to said hangers.

6. The demountable enclosure of claim 5 wherein said flexible fabric housing incorporates a sleeve along the edge proximate to the roofline of the vehicle, for receiving a dowel therethrough, whereby said dowel may be nested in a raingutter along said roofline and secured thereto by clamp means disposed at each end of the sleeve.

7. The demountable enclosure of claim 1 wherein said fabric housing is constructed from a waterproof tenting material.

8. The demountable enclosure of claim 7 wherein said tenting material is a rubberized canvas.

9. The demountable enclosure of claim 7 wherein said tenting material is a treated nylon fabric.

10. The demountable enclosure of claim 7 wherein said fabric housing is provided with closable window openings and, additionally, is provided with a vertical zipper closure substantially centrally disposed in the rear panel thereof.

* * * * *